(12) United States Patent
Larsen et al.

(10) Patent No.: US 7,719,517 B2
(45) Date of Patent: May 18, 2010

(54) INPUT DEVICE FOR A COMPUTER SYSTEM

(75) Inventors: Glen C. Larsen, Issaquah, WA (US);
Thomas C. Oliver, Windsor, CO (US);
David D. Bohn, Fort Collins, CO (US);
Steven N. Bathiche, Kirkland, WA (US);
Ceasar De Leon, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 908 days.

(21) Appl. No.: 11/157,725

(22) Filed: Jun. 21, 2005

(65) Prior Publication Data

US 2006/0284830 A1    Dec. 21, 2006

(51) Int. Cl.
*G09G 5/00* (2006.01)
(52) U.S. Cl. .................. 345/163; 345/156; 359/621; 359/641; 250/208.1; 361/683
(58) Field of Classification Search ............... 345/179, 345/163, 156
See application file for complete search history.

(56) References Cited

U.S. PATENT DOCUMENTS

| | | | | |
|---|---|---|---|---|
| 4,521,772 A * | 6/1985 | Lyon | ........................ | 345/166 |
| 4,647,771 A * | 3/1987 | Kato | ...................... | 250/237 R |
| 5,686,720 A * | 11/1997 | Tullis | ...................... | 250/208.1 |
| 5,768,023 A * | 6/1998 | Sawaki et al. | ............... | 359/622 |
| 5,798,866 A * | 8/1998 | De Vaan | ...................... | 359/621 |
| 5,812,322 A * | 9/1998 | Meyers | ...................... | 359/621 |
| 5,861,873 A * | 1/1999 | Kikinis | ...................... | 345/157 |
| 5,886,686 A * | 3/1999 | Chen | ........................ | 345/168 |
| 5,994,710 A * | 11/1999 | Knee et al. | .................. | 250/557 |
| 6,021,009 A * | 2/2000 | Borodovsky et al. | ........ | 359/888 |
| 6,157,370 A * | 12/2000 | Kravtin et al. | ............. | 345/163 |
| 6,222,174 B1 * | 4/2001 | Tullis et al. | ............. | 250/208.1 |
| 6,256,016 B1 * | 7/2001 | Piot et al. | .................. | 345/166 |
| 6,304,249 B1 * | 10/2001 | Derocher et al. | ............ | 345/163 |
| 6,307,745 B1 * | 10/2001 | Liebenow | .............. | 361/679.55 |
| 6,476,795 B1 * | 11/2002 | Derocher et al. | ............ | 345/163 |
| 6,552,713 B1 * | 4/2003 | Van Brocklin et al. | ...... | 345/157 |
| 6,700,564 B2 | 3/2004 | McLoone et al. | | |
| 6,747,633 B2 * | 6/2004 | Jzuhsiag | ..................... | 345/163 |
| 6,853,365 B2 | 2/2005 | Reid et al. | | |
| 6,940,487 B2 * | 9/2005 | Matsunaga | .................. | 345/156 |

(Continued)

OTHER PUBLICATIONS

CES 2008: business-card sized, Bluetooth-enabled mouse that stores and recharges inside your laptop's PC card slot. Datashet [online]. gizmag.com, 2006, [retrieved on Jan. 13, 2006]. Retrieved from the Internet: <URL:www.gizmag.com/go/4968>.

*Primary Examiner*—Sumati Lefkowitz
*Assistant Examiner*—Grant D Sitta
(74) *Attorney, Agent, or Firm*—Merchant & Gould

(57) ABSTRACT

A peripheral input device having a body configured to be stored within a housing of a computer device is disclosed. In at least one embodiment, a wireless input device is configured to be recharged within the housing. Further aspects of the invention relate to an input device configured to operatively connect to underutilized ports of a computer system. In one embodiment, the input device operatively connects to a PCM-CIA port of a computer. Yet further aspects of the invention relate to an input device having an expandable body, wherein the body may be configured to have an increased surface area upon expansion of the body.

18 Claims, 5 Drawing Sheets

U.S. PATENT DOCUMENTS

| | | | |
|---|---|---|---|
| 6,967,321 B2 * | 11/2005 | Leong et al. | 250/239 |
| 6,970,156 B1 * | 11/2005 | Silverstein | 345/163 |
| 7,071,923 B2 * | 7/2006 | Wang et al. | 345/166 |
| 7,161,682 B2 * | 1/2007 | Xie et al. | 356/520 |
| 7,280,351 B2 * | 10/2007 | Rankins et al. | 361/679.55 |
| 7,321,359 B2 * | 1/2008 | Xie et al. | 345/163 |
| 7,362,309 B2 * | 4/2008 | Chao et al. | 345/164 |
| 7,399,954 B2 * | 7/2008 | Venkatesh | 250/221 |
| 7,418,016 B2 * | 8/2008 | Gruhlke et al. | 372/29.014 |
| 7,499,028 B2 * | 3/2009 | Eichenberger et al. | 345/163 |
| 2003/0142075 A1 * | 7/2003 | Chin | 345/163 |
| 2006/0023410 A1 * | 2/2006 | Solomon et al. | 361/683 |
| 2006/0176277 A1 * | 8/2006 | Daniel et al. | 345/163 |

* cited by examiner

INPUT DEVICE FOR A COMPUTER SYSTEM

BACKGROUND

The use of input devices to control computer systems are well-known in the art. More particularly, a hand-movable input device that controls movement of a cursor or other mechanism and allows selection of functions on a computer system device is generally referred to as a "mouse". As used herein, the term "mouse" can encompass a wide variety of input devices that provide an input to a computing device, including, but not limited to: "track pads", "track balls", "scrollers", "joy sticks", "soft buttons" "mouse-pens", "light pens" and other positioning or pointing systems. Moreover, while numerous embodiments may comprise a rotatable ball to provide movement, the present invention is not limited thereto. It will be appreciated by those in the art that various mouse movement sensing system alternatives are well known and available, such as mice with optical sensors for sensing mouse movements. Moreover, as described in detail below, the present invention is not limited to a mouse-type input device, but rather is directed to a wide range of input devices for a computer system.

In recent years, computer systems have become increasingly mobile. A recent study indicated over 24% of U.S. households owned at least one laptop computer. Indeed, with this emerging market, users of these and other portable computer devices demand more mobile input devices. In an attempt to meet this demand, manufacturers have introduced "laptop class" mice that are generally more compact than their desktop counterparts. While these laptop class mice are more mobile and provide one alternative to standard mice, they also have numerous disadvantages. Like traditional mice, they must be disconnected and separately stored before transporting the mobile device. Not only is this inconvenient to the user, but generally, this increases the likelihood of losing or misplacing the input device. Moreover, laptop computers and portable computing devices generally have fewer number of interfaces and ports required for the operation of the input device; therefore the user may not have enough ports to use the input device or will have to expend additional resources to purchase a "hub" or other peripheral to use the device. In most cases, the needed hub, like the laptop class mice, will have to be disconnected and separately stored before transporting the mobile computer.

SUMMARY

Aspects of the invention relate to a peripheral input device having a body configured to be stored within a housing of a computer device. In at least one embodiment, a wireless input device is configured to be recharged within the housing. Further aspects of the invention relate to an input device configured to operatively connect to underutilized ports of a computer system. In one embodiment, the input device operatively connects to a PCMCIA port of a computer. Yet further aspects of the invention relate to an input device having an expandable body, wherein the body may be configured to have an increased surface area upon expansion of the body.

These and other advantages will become apparent from the following detailed description when taken in conjunction with the drawings, A more complete understanding of the present invention and the advantages thereof may be acquired by referring to the following description in consideration of the accompanying drawings, in which like reference numbers indicate like features, and wherein:

DETAILED DESCRIPTION

Exemplary Operating Environment

Figure 1:
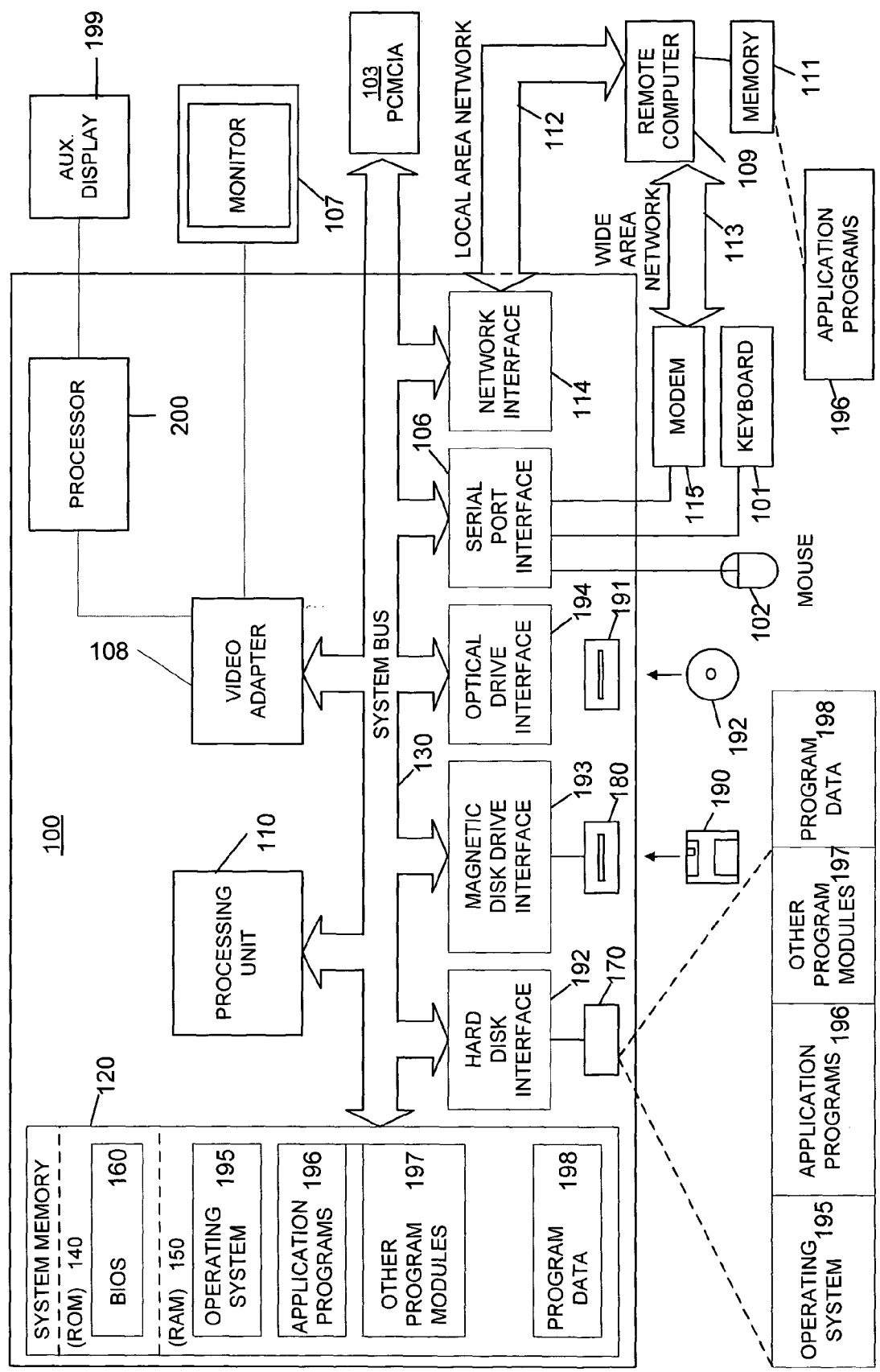
FIG. 1 illustrates an exemplary computer system in which embodiments of the invention may be implemented.

FIG. 1 is a functional block diagram of an example of a conventional general-purpose digital computing environment that can be used in connection with various input devices. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
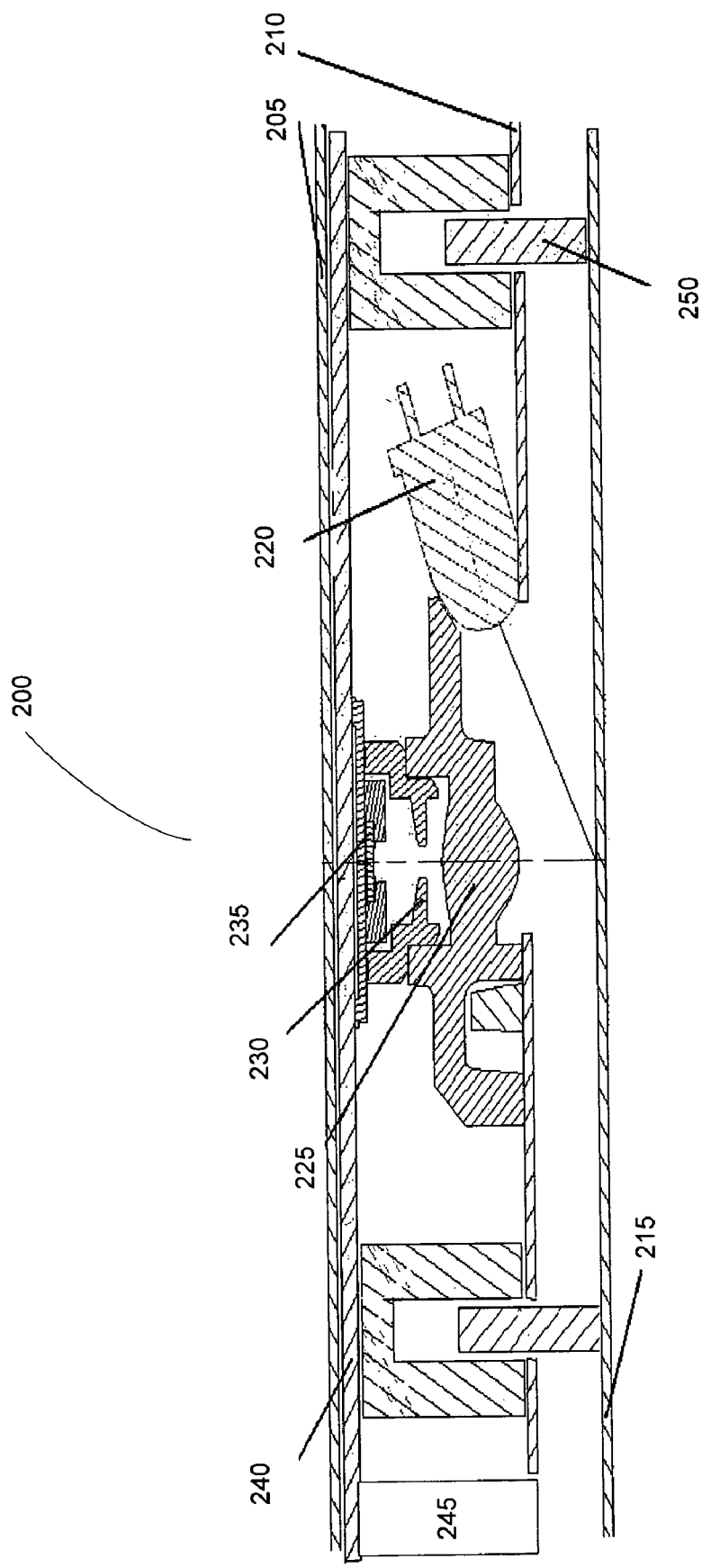
FIG. 2 illustrates a cross-sectional view of one exemplary input device of the present invention.

FIG. 2 illustrates a cross-sectional view of one exemplary input device of the present invention. The exemplary input device 200 is comprised of a body having at least a top 205 and a bottom 210. The distance between the top 205 of the body 200 and the bottom 210 of the body is less than the height of at least one port, interface, or cavity of a user computer, such as computer 100, wherein the input device 200 can be inserted within the port, interface, or cavity of the computer. As used herein, any port, interface, or cavity of the user computer that may receive at least a portion of the input device 200 will be referred to as a "housing". In one embodiment, the input device has a body that is configured to be received by a PCMCIA slot (housing) of a user computer. In such an embodiment, the distance between the top 205 and the bottom 210 of the body is equal to or less than 5 millimeters and the width of the top 205 and the bottom 210 will not exceed 54 millimeters. As one skilled in the art will appreciate, the terms "height" and "length" are merely used to illustrate the positioning of the input device 200 within the housing and are relative to the form factor of the computer and positioning of the housing.

Moreover, while the above example provides the dimensions of a particular housing, one skilled in the art will appreciate there are numerous interfaces or ports of a computer that may serve as a housing. For example, a 5.25 inch or 3.50 inch disk drive bay may be used or otherwise converted into a housing for the input device 200. Indeed, any part of a user computer that has or can be converted to have a cavity to accommodate a portion of the body of the input device 200 is a housing within the scope of the present invention.

In other embodiments, it may be desirable to have the entire input device 200 fit within the housing. Such a configuration may prevent damage to the input device, provide increased security, and/or improve aesthetic qualities of the user computer. In at least one embodiment, the input device can be stored within a housing of the user computer. In yet another embodiment, the body may further comprise extrusions, grooves, or other means to secure the input device 200 within the computer housing or a particular portion of the housing. In yet further embodiments, an existing interface may secure the input device within the computer. For example, referring to an embodiment configured to fit in a PCMCIA slot, an existing NIC interface may be used to secure or otherwise hold the input device. As explained in more detail below, an interface within the housing may be used to electronically connect or communicate with the input device.

Input device 200 further comprises a tracking mechanism wherein movement of the device or a portion of the device 200 over a tracking surface 215 will provide a user input to a computer that is operatively connected to the input device. The illustrative embodiment in FIG. 2 is based on optical navigation technology, wherein an illumination source 220, such as for example, a light emitting diode (LED) may emit light onto a tracking surface 215. The reflection of this light from the tracking surface may be directed through a lens 225 and an aperture 230 and unto an imaging sensor 235, such as for example, a complimentary metal-oxide semiconductor ("CMOS") sensor. The imaging sensor then may send the image to a printed circuit board (PCB) 240 housed within the body of the input device for analysis. The PCB may comprise electronics that detect patterns and based on the change in the pattern, determine how far and fast the mouse has moved. This information can then be sent to a computer through an interface, such as interface 245 so that a corresponding display, such as a cursor can be moved in a corresponding manner. While the CMOS sensor can be a two dimensional sensor, through predictive algorithms it is possible to use a single row sensor to determine the relative velocity of the mouse. However, one skilled in the art will readily appreciate that numerous alternative tracking mechanisms may be utilize without departing from the scope of the present invention, such as laser navigation technology.

In yet other embodiments, the tracking mechanism may comprise a rotational component that rotates as the input device 200 is moved across the surface wherein the movement of the rotational component is measured and correlated to the input provided to the user component. In still yet further embodiments, the tracking mechanism does not require a tracking surface. In at least one embodiment, the tracking mechanism is a pressure or heat sensitive material, located for example, on the top 205 of the input device. In operation, a user of the input device 200 may move his/her hand or a portion thereof, on or over the tracking mechanism to provide a user input. One such exemplary embodiment may be similar in appearance to a touch pad that is conventionally positioned below the keyboard of a laptop computer. Having a pressure or temperature sensitive tracking mechanism positioned away from the keyboard and configured to fit within a housing of the computer would be especially advantageous. Indeed, touch pads or other input devices closely positioned to or integrated within keyboards and/or other input devices are often irritating to the user and thus often disabled.

Figure 3:
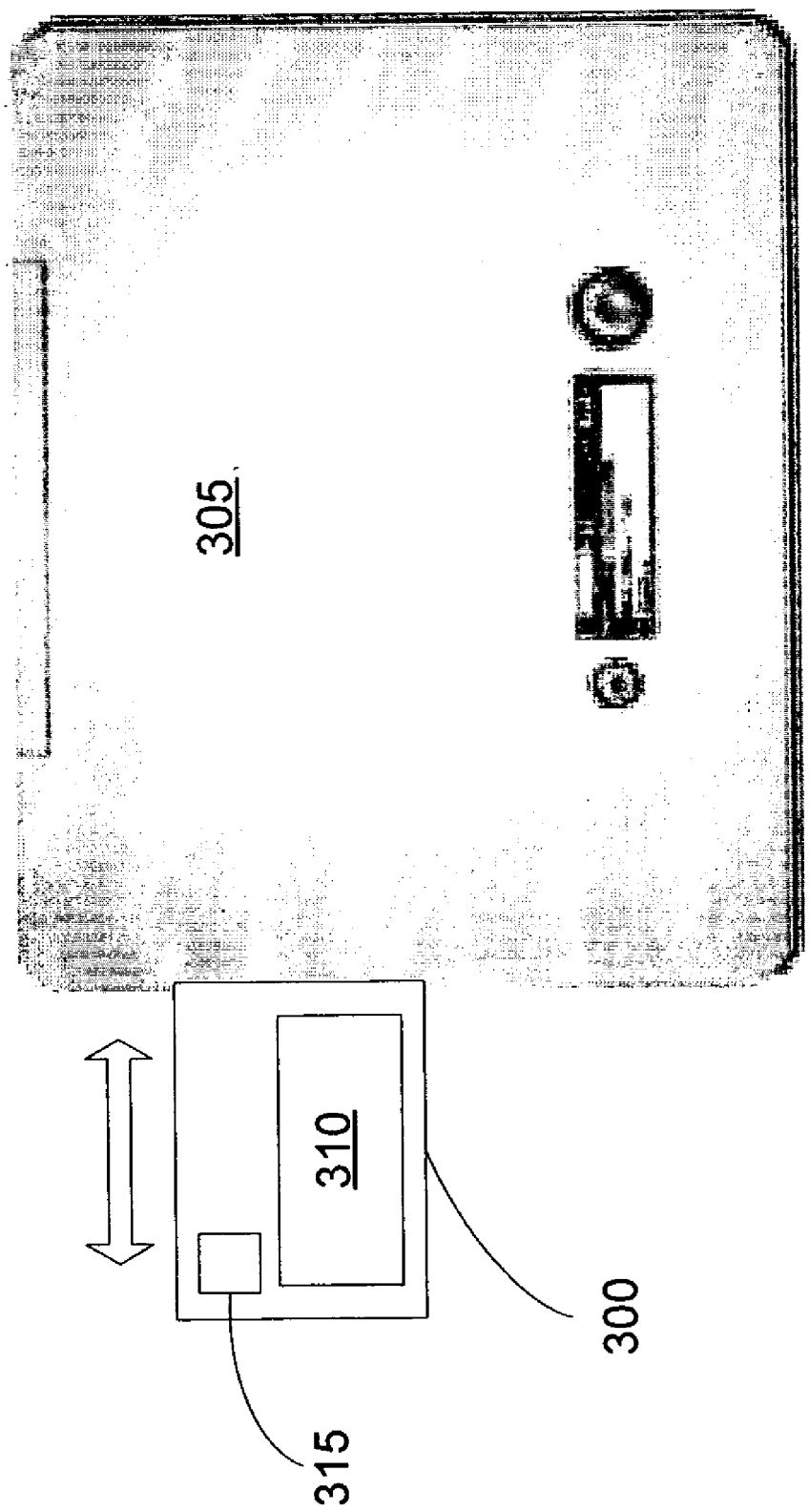
FIG. 3 is a perspective view of one input device according to the present invention having a pressure or touch sensitive surface.

FIG. 3 is a perspective view of one input device according to the present invention having a pressure or touch sensitive surface. Input device 300 is configured to fit within a housing, such as a PCMCIA slot, of the computer 305 and has a surface 310 that is configured to directly receive an input from the user. In one embodiment, the input may be in the form of pressure and/or temperature. For example, the movement of a user's hand or portion thereof, such as a finger, across the input surface 310 may be detected and translated into a user input. Such detection and translation is well-known in the art. For example, movement of a user's finger to the upper left portion of the input surface may move a cursor on a display, such as monitor 107, towards the upper left corner of the display. In the exemplary embodiment, the input device further comprises at least one user-selectable input mechanism 315, similar in operation to a button on a mouse. As illustrated in the figure, the input device 300 may be slidably or otherwise engaged with the housing. In one embodiment, the input device 300 may slide entirely out of the housing. In such an example, the input device may communicate wirelessly with the computer 305 or have an interface that communicates with a port or interface within the housing. In yet other embodiments, the input device 300 may be removed from the housing and connected to a port or interface not within or otherwise associated with the housing. In one embodiment, the input device is removed from a PCMCIA slot and is then operatively connected to a USB port on the computer. In yet another embodiment, the input device remains slidably engaged within the housing. For example, the input device may be extended out of the housing, but remains in communication with the housing or an extension thereof to prevent the disassociation of the input device 300 with the housing 302. In addition, input devices of the present invention may further include at least one user-selectable input mechanism, such as a button or switch.

Figure 4:
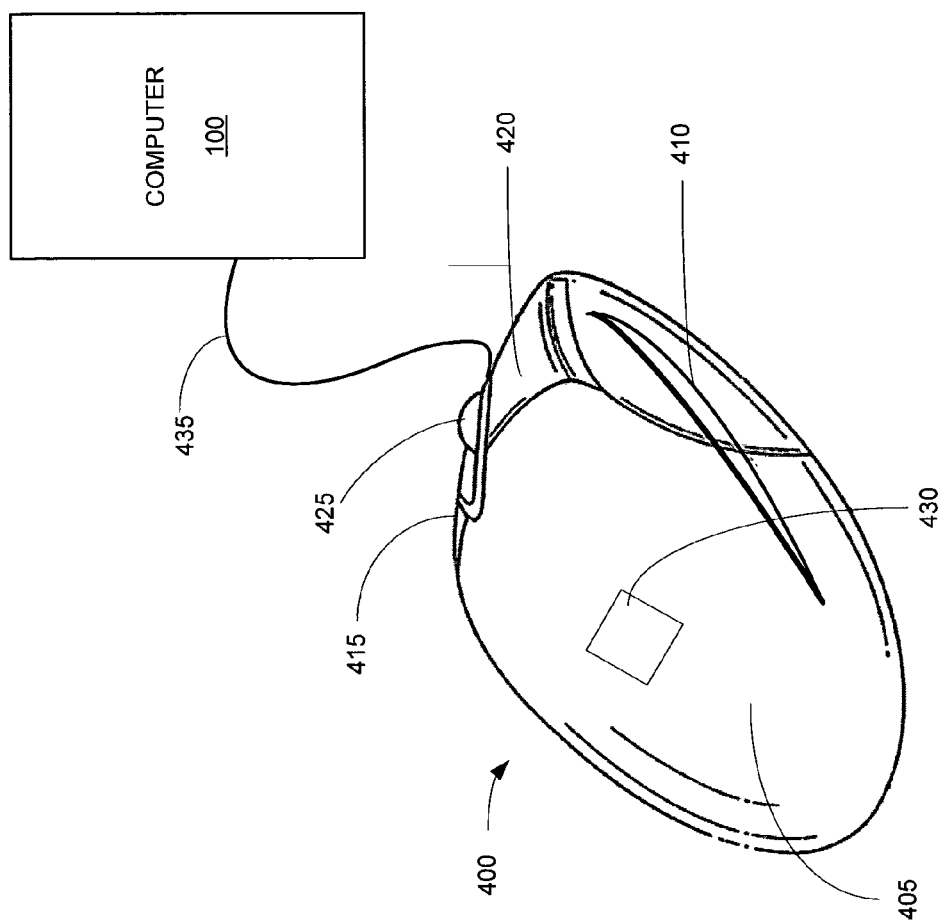
FIG. 4 is a perspective view of an exemplary input device having a tracking mechanism and at least one user-selectable input mechanism.

FIG. 4 is a perspective view of an exemplary input device 400 having a tracking mechanism and at least one user-selectable input mechanism. The input device 400 resembles a conventional mouse body having a top 405 and a bottom (not shown). As illustrated in the figure, the body does not have to conform to dimensions of the housing, such as housing 302, but rather must be configured to have at least a portion of the input device to be housed within the housing. Like input device 300, input device 400 may slidably engage the inner cavity of the housing. For example, extensions or notches, such as extension 410 may be positioned on the body of the input device to aid the positioning and/or communication of the input device with the housing. Of course, one skilled in the art will recognize there are numerous alternatives that would allow exact positioning and/or guided movement of the input device 400 within the housing. As described above, extension 410 may be configured to restrict the removal of the input device from the housing. The illustrated embodiment further comprises user-selectable input mechanisms in the form of buttons 415, 420 which are placed on the top 405 of the body. While the illustrated embodiment has two buttons on the front portion of the top 405 of the body, other embodiments may further include buttons or other user selectable input mechanisms anywhere on the body. The input devices may optionally include a scrolling apparatus, such as scroll wheel 425. Generally, a scroll wheel will partially protrude from the body of the input device and be associated with an internal sensor, wherein rotation of the wheel will provide a user input to the computer. One type of scroll wheel is described in U.S. Pat. No. 6,700,564. Input device 400 may further include a touch pad or other pressure or heat sensitive surface 430 in place of or in addition to another tracking mechanism, such as described above. In one embodiment, heat surface 430 may be used as the sole tracking mechanism of input device 400. This would be especially advantageous in settings where space to maneuver the input device over a tracking surface is limited. Indeed, any input device in accordance with the present invention may comprise a pressure or heat sensitive surface as a tracking mechanism to provide an input to a computer, such as computer 100.

Input device 400 further comprises an interface 435 that operatively connects the input device with the computer. As one skilled in the art will appreciate, the interface may be wired or wireless. Referring first to wired interfaces, the interface 435 may comprise a proximate end and a distal end, wherein the proximate end is in communication with the input device and the distal end is in electrical communication with the computer. In one embodiment, the distal end is configured to complement the PCMCIA interface of a laptop computer. In yet another embodiment, the distal end is configured to complement a portion of a PCMCIA interface. In still yet another embodiment, the joining of the distal end of the interface with the computer operatively connects the input device, whereas in another embodiment connecting the interface further allows the input device to recharge a local energy source.

Energy sources may comprise both rechargeable and non-rechargeable batteries and may be external or internal to the input device. In regards to rechargeable batteries, there are numerous types of batteries that may be utilized in the input device of the present invention, including but not limited to: Nickel-Cadmium (NiCD), Nickel-Metal Hydride (NiMH), Lithium-ion (Li-ion), and Zinc-Air. Li-ion batteries in the form of moldable packaging has been found to be extremely practical to the inventors, since it may be molded to fit the contours of the body of the input device.

While the exemplary device is described in relation to the PCMCIA slot, one skilled in the art will realize that a wired interface that interacts with different computer ports may be provided. The distal end of the interface may be configured to communicate with a plurality of ports of a computer, including but not limited to USB, serial and parallel. In still yet another embodiment, the proximate end of the interface is detachable, thereby allowing the user to use the same input device as a wired input device or a wireless input device.

In at least one embodiment, the wireless interface is utilized to operatively connect the input device with the computer. Wireless communication system may include, but are not limited to Bluetooth, IEEE 802.11x, IRDA, 27 MHz, 900 MHz, and the like. In one embodiment, the wireless interface is in operative communication with a port within the housing. For example, a wireless interface may be in operative communication with the PCMCIA slot that is also utilized to store the input device. In yet another embodiment, the wireless interface operatively communicates with a port not within the housing the input device is stored in. For example, in one embodiment, an input device having a detachable wireless interface may be stored within a PCMCIA slot. Upon use, the interface is connected to a USB port external to the PCMCIA slot, thereby allowing the input device to be used wirelessly. In still yet another embodiment, the proximate end of the wireless interface may be used to recharge the input device upon connection to a port of the computer. In other embodiments, the input device comprises an additional port to allow recharging of the device. It still yet further embodiments, a super capacitor may be used to power the input device.

Input devices of the present invention may comprise an expandable body or portion thereof to increase the surface area upon expansion of the body. Expansion of the body may be performed by a user upon removing the input device from the housing and may be collapsed prior to reinsertion of the device within the housing. In at least one embodiment, the surface area of the input device is automatically increased upon removal of the device from the housing. Expansion of the body may be accomplished by a plurality of mechanisms, depending on the configuration and expected use of the device, among other factors. For example, an input device configured to resemble a mouse similar to that illustrated in FIG. 4 may be configured to have an increased surface area on the top 405 of the input device, thereby providing more surface area for the user to grasp and manipulate the device. Increasing the surface area of the top of the body may be done by collapsible protrusions, an air bladder or any other mechanism known to those skilled in the art.

Other sections of the body may be expandable to increase the surface area of the input device. Returning to FIG. 2, the illustrative input device is configured to have extendable protrusions 250 extending from the bottom 210 of the input device. The illustrative protrusions may be positioned within the body while the input device is stored within the housing and configured to be retractable upon removal of the input device from the housing. In one embodiment, the protrusions may be similar to a push-on, push off alternating button switch, such that in the "closed" position the feet are flush with the outer case, while in the extended position, the protrusions elevate the input device. In at least one embodiment, the extension of protrusions 250 allows for the correct positioning of the optics. In yet another embodiment, the "push-on, push off" behavior is accomplished mechanically with a stiff wire tip sliding over a series of very small ramps and slots. These mechanisms are very typical in switches and retractable devices such as extendable phone or network jacks on laptop computers. Other mechanisms which could be used include concentric ramps in typical click-on, click off ball point pens. Of course one skilled in the art will appreciate the numerous alternatives that could be implemented to create such protrusions.

Indeed, the exemplary protrusions are only shown by way of example, one skilled in the art will appreciate more or less protrusions may be used in various locations on the body and have different shapes and sizes. It is also to be understood that protrusions extending from the bottom of the body may further comprise wheels, sliders, or material to aid the movement of the input device on the tracking surface. In one embodiment, the use of protrusions on the body of the input device positions the lens about 8 mm above the tracking surface. Yet in another embodiment, the length and/or width of the input device may be increased.

Figure 5:
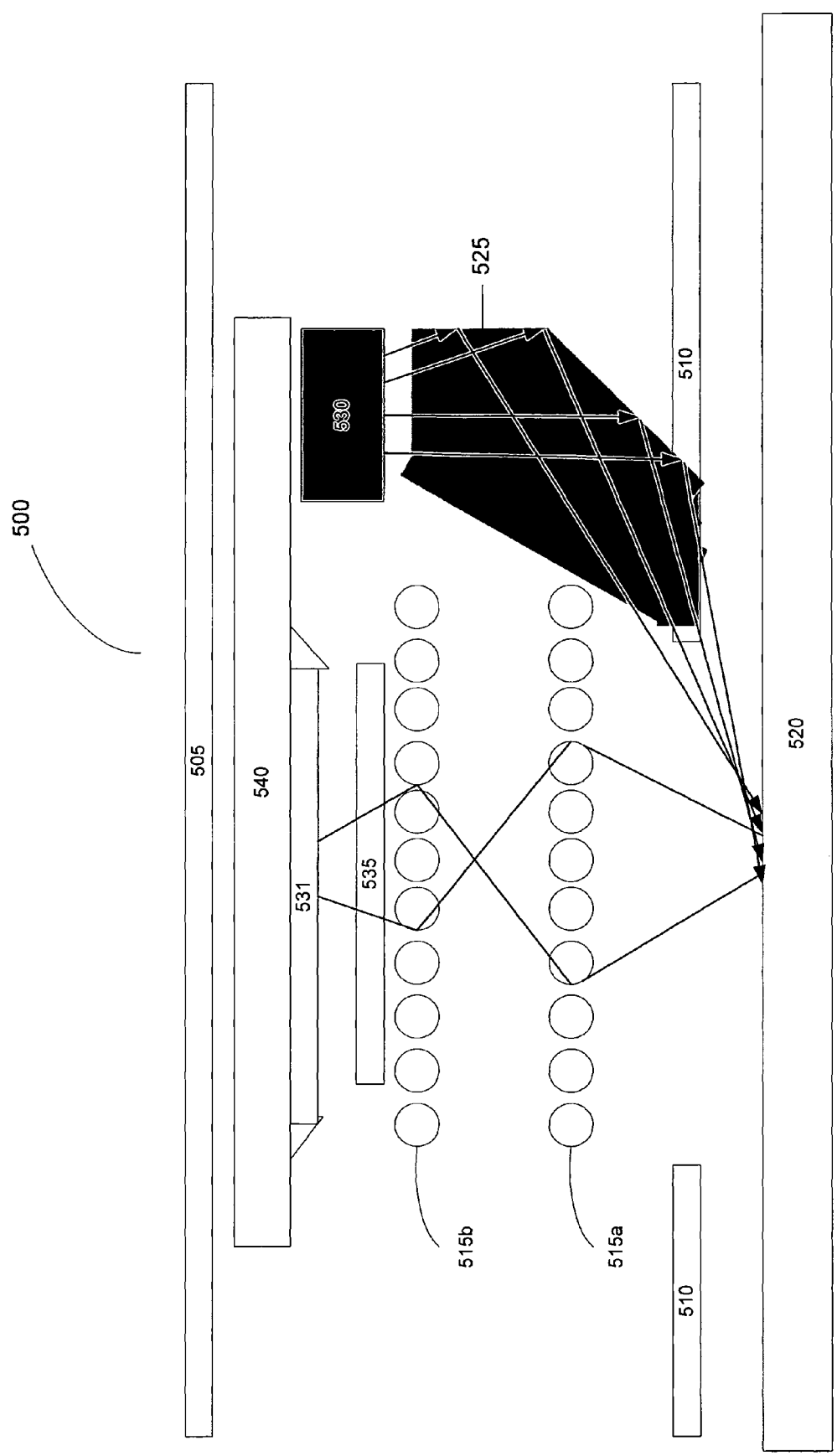
FIG. 5 is an exemplary input device of the present invention having a novel optical navigation system.

FIG. 5 is an exemplary input device of the present invention having a novel optical navigation system. The illustrated novel optical navigation system is housed entirely within the top 505 and the bottom 510 of the device, and does not require expansion of the device for operation of the optical navigation system. However, one embodiment of the invention may have an expandable body to improve user comfort, ease of use, among other factors.

The input device 500 comprises at least one microlens array (ie. 515a) positioned above the tracking surface 520. Conventional input devices use a solitary lens to focus light reflected from a surface onto an optical sensor. When a solitary lens is used, it is necessary for the lens to have a relatively large thickness in order to focus all of the received light. In contrast, the use of a microlens array allows for the use of a thinner focusing element, which can reduce the overall thickness of the input device. As shown in the illustrated embodiment, a plurality of microlens arrays 515a, 515b are associated with a light pipe 525, wherein the light pipe is associated with a light source 530. In operation, the light source 530 emits light energy which travels through the light pipe 525. One skilled in the art will understand a plurality of materials may be used as a light pipe. The inventors of the present invention have found that polycarbonate serves as an acceptable material for a light pipe suitable for the present invention.

The light travels through the light pipe and at least a portion of the light energy exits the light pipe and strikes a surface, such as tracking surface 520 at a grazing angle. The exact angle the light strikes the surface will vary among different embodiments; however, the inventors have found an angle at or about 20.degree. to be one acceptable angle for use with optical systems in accordance with at least one embodiment of the present invention. Upon striking the tracking surface 520, the light is reflected upward towards at least one microlens array, such as microlens array 515a. In the illustrated embodiment, a second ray 515b is utilized to direct the light. The second microarray 515b may be configured to prevent the optical "diameter" of the reflected light from being too large as it travels towards the sensor 531. As one skilled in the art will realize the number, size, and placement of microarrays will depend on a myriad of factors, including but not limited to: the type and quality of the optical components and tracking surface, the tracking quality desired, and distance inbetween the optical components, such as for example, the distance from the tracking surface to a first microarray, the distance from the first and second microarrays, and the distance from the second microarray to the sensor.

As seen in the illustrated embodiment, the microlens array 515b may then focus light through an aperture plate 535 to make contact with the light sensor 531. While the aperture plate 535 is located above the second microlens array, one skilled in the art will realize the aperture plate may be located at numerous locations within the path of the light, including for example, inbetween the microlens arrays 515a, 515b. In the illustrated embodiment, the light sensor is associated with a PCB 535. The PCB may further comprise electronics to compute and transmit the input received at the light sensor.

In other embodiments, the microlens array may comprise optical material having a gradient surface, such as a SELFOC lens. In such lenses, the index of refraction within the lens material may be varied to redirect the light towards a point of focus. However, in yet other embodiments, other optical components may be used in place of a microlens array, such as for example, a fiber optic plate (FOP). One or more FOPs may be used within an input device of the present invention in conjunction with or independent of other lenses. As one skilled in the art will understand, a large variety of optical navigation systems may be used, for example, SPECKLE technology, without departing from the scope of the present invention. Indeed, the illustrated navigation systems are provided to aid the reader in better understanding the nature of the invention.

The present invention has been described in terms of exemplary embodiments. Numerous other embodiments, modifications and variations within the scope and spirit of the appended claims will occur to persons of ordinary skill in the art from a review of this disclosure.

We claim:

1. A peripheral input device for a computing system having a housing, the input device comprising:
   a body comprising:
      a top and a bottom, wherein the top and the bottom are not greater than 5 mm in height and 54 mm in width and configured to be stored within the housing of the computing system, and
      at least one first extendable protrusion designed to extend, upon removal of the input device from the housing of the computing system, from the bottom of the input device in order to elevate the input device wherein the body comprises an expandable body comprising at least one second extendable protrusion extending from the top of the body, the at least one second extendable protrusion comprising at least one optics component, wherein a distance between the optics component and the bottom of the body increases upon expansion of the body;
   a tracking mechanism, wherein the tracking mechanism is an optical system configured to detect movement of the bottom of the body over a surface, wherein the optical system comprises:
      a light source for emitting light,
      a light pipe for receiving at least a portion of the light emitted from the light source, wherein at least a portion of the light within the light pipe is projected onto the tracking surface,
      at least one first microlens array located within the body and positioned to receive light reflected from the tracking surface,
      at least one second microlens array located within the body and positioned to receive light redirected from the at least one first microlens array, wherein the at least one second microlens array is configured to constrain an optical diameter of the redirected light,
      an aperture plate located between the at least one first microlens array and the at least one second microlens array, wherein the received light redirected from the at least one first microlens array is focused through the aperture plate to the second microlens array, and
      a light sensor in optical communication with the at least one second microlens array; and
   an interface for interfacing the computing system.

2. The input device of claim 1, wherein the length of the body is not greater than 86 mm.

3. The input device of claim 1, wherein the housing of the computing system is a PCMCIA slot.

4. The input device of claim 1, wherein the interface is configured to electronically communicate with a PCMCIA port of the computer.

5. The input device of claim 4, wherein the interface comprises a wireless communication system.

6. The input device of claim 1, wherein the interface is configured to electronically communicate with a computer port that is external to the computer housing.

7. The input device of claim 1, wherein the body of the input device is configured to slidably engage with the housing.

8. The input device of claim 1, wherein the expandable body is configured to have an increased surface area upon expansion of the body.

9. An input device for a computing system having a housing, wherein the input device is configured to move over a tracking surface, the input device comprising:
   a body comprising:
      a top and a bottom, wherein the top and the bottom are not greater than 5 mm in height and 54 mm in width and configured to be stored within the housing of the computing system, and
      a plurality of extendable protrusions, wherein at least one first extendable protrusion of the plurality of extendable protrusions is designed to:
         retract from the bottom of the input device upon removal of the input device from the housing of the computing system, wherein the at least one first extendable protrusion employs an alternating button switch mechanism for retraction, and
         elevate the input device wherein the body comprises an expandable body comprising at least one second extendable protrusion of the plurality of extendable protrusions, the at least one second extendable protrusion extending from the top of the body, the at least one second extendable protrusion comprising at least one optics component, wherein a distance between the optics component and the bottom of the body increases upon expansion of the body;
   an optical navigation system comprising:
      a light source for emitting light,
      a light pipe for receiving at least a portion of the light emitted from the light source, wherein at least a portion of the light within the light pipe is projected onto the tracking surface,
      at least one first microlens array located within the body and positioned to receive light reflected from the tracking surface,
      at least one second microlens array located within the body and positioned to receive light redirected from the at least one first microlens array, wherein the at least one second microlens array is configured to constrain an optical diameter of the redirected light,
      an aperture plate located between the at least one first microlens array and the at least one second microlens array, wherein the received light redirected from the at least one first microlens array is focused through the aperture plate to the second microlens array, and
      a light sensor in optical communication with the at least one second microlens array; and
   an interface for interfacing with the computing system.

10. The input device of claim 9, wherein the at least one microlens array is in rigid communication with the light pipe.

11. The input device of claim 9, wherein the length of the body is not greater than 86 mm.

12. The input device of claim 9, wherein the computer system housing is a PCMCIA slot.

13. The input device of claim 9, wherein the interface is configured to electronically communicate with a PCMCIA port of the computer.

14. The input device of claim 13, wherein the interface comprises a wireless communication system.

15. An input device for a computing system having a housing, the input device comprising:
   a body comprising a top and a bottom, wherein the top and the bottom are not greater than 5 mm in height and 54 mm in width body is configured to be stored within the housing of the computing system, wherein the body of the input device is configured to:
      slidably engage with the housing, and
      have extendable protrusions designed to extend from the bottom, wherein the extendable protrusions are positioned within the body when the input device is stored within the housing of the computing system and are designed to extend 8 mm from the input device upon removal of the input device from the housing of the computing system, the extendable protrusions comprising one of the following: wheels and sliders;

a tracking mechanism, wherein the tracking mechanism has a surface configured to directly receive an input from a user;

an interface for interfacing the computing system, wherein the interface comprises a wireless communication system;

a rechargeable power source, wherein the rechargeable power source is configured to recharge when the input device is stored within the housing of the computing system;

an optical navigation system comprising:
- a light source for emitting light,
- at least one first microlens array located within the body and positioned to receive light reflected from the tracking surface,
- at least one second microlens array located within the body and positioned to receive light redirected from the at least one first microlens array, wherein the at least one second microlens array is configured to constrain an optical diameter of the redirected light,
- an aperture plate located between the at least one first microlens array and the at least one second microlens array, wherein the received light redirected from the at least one first microlens array is focused through the aperture plate to the second microlens array, and
- a light sensor in optical communication with the at least one second microlens array; and at least one user-selectable input mechanism.

16. The input device of claim 15, wherein the tracking mechanism surface is configured to directly receive the input selected from the group consisting of temperature, pressure, and combinations thereof.

17. The input device of claim 1, wherein at least one of the following: the at least one first microlens array and the at least one second microlens array comprise optical material having a gradient surface.

18. The input device of claim 9, wherein at least one of the following: the at least one first microlens array and the at least one second microlens array comprise optical material having a gradient surface.

* * * * *